April 26, 1927.
M. S. IRISH
1,625,999
DOMESTIC COOKING VESSEL
Filed Dec. 26, 1924
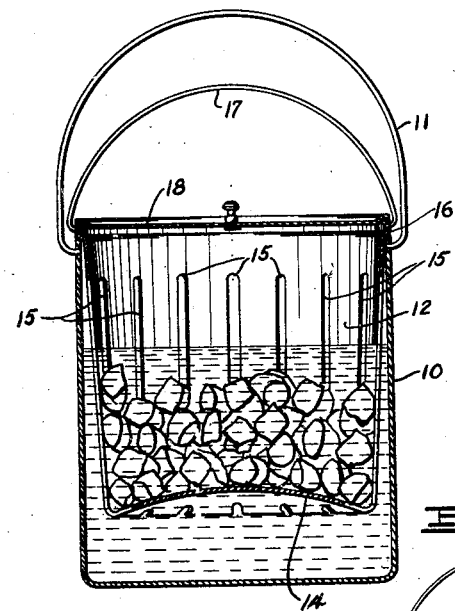
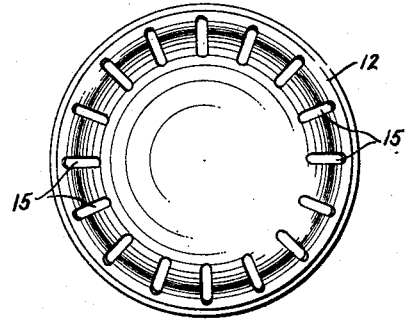
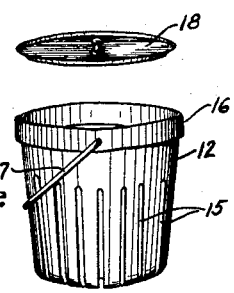
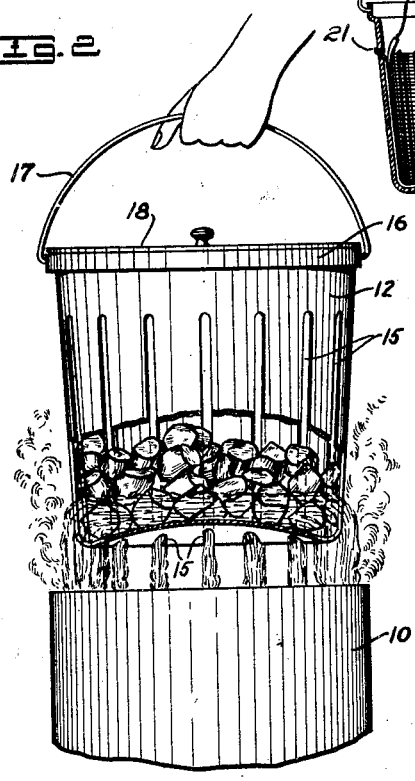
INVENTOR.
MARY S. IRISH
BY
ATTORNEY.

Patented Apr. 26, 1927.

1,625,999

UNITED STATES PATENT OFFICE.

MARY S. IRISH, OF LOS ANGELES, CALIFORNIA.

DOMESTIC COOKING VESSEL.

Application filed December 26, 1924. Serial No. 758,124.

This invention relates to domestic cooking vessels.

The general object of the invention is to provide an improved cooking vessel for cooking articles such as vegetables wherein the vessel is constructed in such a manner that the articles will not be burned and wherein at the same time a vessel is provided which may be economically made and which can be easily used.

One of the specific objects of the invention is to provide a two part domestic cooking vessel wherein an inner container is provided with a cupped bottom and wherein the sides are provided with slots to allow free circulation of water.

A further object of the invention is to provide a cooking vessel comprising inner and outer members wherein the inner member has a concavo-convex bottom and is provided with slots which merge into the bottom so that fluid will quickly drain from the inner vessel.

A further object of the invention is to provide a duplex cooking vessel wherein the inner vessel is perforated to provide drainage and wherein the inner vessel is provided with a screen container.

Other objects of the invention will be apparent from the following description taken in connection with the accompanying drawings wherein Fig. 1 is a central sectional view through a vessel embodying the features of my invention; Fig. 2 is a side elevation showing the operation of removing one vessel from the other; Fig. 3 is a bottom plan view of the inner member; Fig. 4 is an extended view of the vessel showing the parts separated, and Fig. 5 is a sectional view showing the screen cup.

Referring to the drawing by reference characters, I have shown a one-piece outer vessel 10. This vessel may be constructed in any desired manner, although it is shown as provided with a flat bottom and with a cylindrical side wall. The vessel 10 is indicated as provided with a suitable handle 11.

The vessel 10 is adapted to receive an inner vessel 12 which may be constructed as shown. This vessel comprises a body having tapered sides which merge into a bottom 14. This bottom 14 is dished upwardly to provide a concavo-convex portion as shown. The sides of the vessel 12 are provided with a plurality of longitudinally extending slots 15. Each of these slots extends from a point spaced below the top of the sides to and into the bottom 14.

The inner vessel 12 is provided with an outwardly extending lip 16 and the diameter of this lip 16 corresponds substantially with the diameter of the top of the vessel 10. so that the lip 16 may be fitted upon the upper end of the vessel 10 to hold the inner vessel in suspended position with the bottom 14 disposed some distance above the bottom of the outer vessel. A handle or bail 17 may be secured to the inner vessel and preferably I secure this bail in the lip 16 as shown in Fig. 1.

Mounted upon the inner vessel 12, I show a lid 18 which has its outer portion arranged to fit upon the upper edge of the lip 16 as shown.

In use the articles to be cooked will be prepared and placed in the inner vessel 12. The inner vessel will then be inserted in the outer vessel. Water may be poured into the outer vessel either before or after the inner vessel is inserted therein and the outer vessel may be set upon a stove and the articles cooked. After the articles have been cooked sufficiently, the handle 17 of the inner vessel may be grasped by the cook and the inner vessel removed as shown in Fig. 2. The water contained in the vessel 12 will run out through the slots 15 so that the articles will drain thoroughly. If longer draining is desired, the inner vessel may be set in a kitchen sink for as long a period as desired.

The curved cupped bottom 14 together with the portions of the slots 15 which enter this cupped bottom are important features of my invention, since they allow thorough draining of the cooked articles. The elongated slots are also of great utility since mere perforations would not allow a complete circulation through the inner vessel and would thus require more heat in the cooking process. The cupped bottom also serves as a deflector for the hot water so that in effect a current is established throughout the container. The water rises from the heated central portion of the bottom of the container 10 and strikes the downwardly cupped bottom of the container 12 and is deflected toward the outer edges of the outer walls of the outer container whence it passes upwardly. Although I have described my invention as a domestic cooking vessel, I wish it to be understood that it is well adapted for use in the industrial arts or wherever it is desired to heat articles without burning them.

In cooking small articles, such as rice, lentils, etc., it is desirable that a liner be provided for the inner container 12. Accordingly in Fig. 5 I have illustrated at 20 a receptacle which is preferably made of wire cloth or other meshlike material. At opposite sides of the receptacle 20, I provide upstanding ears 21 which are adapted to be inserted through the upper ends of the slots 15 and are arranged to engage the outer wall of the vessel 12 as shown in Fig. 5. The natural resilience of the metal used in the screen is such that the ears 21 engage the outer wall of the container and hold the screen receptacle in place. Suitable handles 22 may be provided adjacent the ears 21 so that when the user wishes to remove the screen container he may merely pull inwardly on the handles 22 thus disengaging the ears 21.

Having thus described my invention, I claim:

In a device of the class described, an interior and an exterior vessel, said inner vessel having a tapering side wall spaced from the outer vessel and having a dished upwardly projecting bottom, said inner vessel having a plurality of longitudinally extending slots in its side wall, said slots extending from a point intermediate the side wall of said inner vessel to and into the outer portion of the upwardly dished part of said dished bottom and the remaining portion of the bottom being imperforate, said inner vessel having a lid thereon.

In testimony whereof, I hereunto affix my signature.

MARY S. IRISH.